United States Patent [19]
Farrington et al.

[11] Patent Number: 4,894,678
[45] Date of Patent: Jan. 16, 1990

[54] PREFLASH PSEUDOFOCUS/EXPOSURE CONTROL SYSTEM

[75] Inventors: David L. Farrington, Boxborough; Norman D. Staller, Beverly; George D. Whiteside, Lexington, all of Mass.

[73] Assignee: Polaroid Corporation, Cambridge, Mass.

[21] Appl. No.: 345,959

[22] Filed: May 1, 1989

[51] Int. Cl.⁴ ............................................. G03B 15/05
[52] U.S. Cl. .................................................... 354/415
[58] Field of Search ................. 354/415, 417, 247, 412

[56] References Cited

U.S. PATENT DOCUMENTS

| | | | |
|---|---|---|---|
| 3,415,644 | 12/1968 | Land | 430/220 |
| 3,753,392 | 8/1973 | Land | 354/86 |
| 3,942,183 | 3/1976 | Whiteside | 354/436 |
| 4,427,276 | 1/1984 | Feinerman | 354/412 |
| 4,459,005 | 7/1984 | Harvey | 354/403 |

Primary Examiner—L. T. Hix
Assistant Examiner—David M. Gray
Attorney, Agent, or Firm—John J. Kelleher

[57] ABSTRACT

An image of a subject in a scene formed by a fixed focus lens through a scanning aperture of an electronic flash camera, particularly that of a subject located closer to the lens than the near distance of its lens normal depth of field, has its clarity or sharpness substantially improved by firing the electronic flash during exposure at the smallest possible aperture for optimum subject image sharpness and overall scene exposure. The appropriate aperture to produce such an image is a function of ambient scene brightness and of the IR light from the electronic flash being reflected from a subject within the scene which are determined prior to and/or at the early stages of an exposure interval.

12 Claims, 2 Drawing Sheets

PREFLASH PSEUDOFOCUS/EXPOSURE CONTROL SYSTEM

BACKGROUND OF THE INVENTION

1. Field of the Invention

The present invention relates to an electronic flash camera having a fixed focus lens that forms an image through a scanning aperture, in general, and to such a camera wherein the size of the aperture at which the electronic flash is fired during exposure is determined by scene brightness and subject reflectivity levels, in particular.

2. Description of the Prior Art

It is well known that the sharpness of an image formed by a lens at an image plane is primarily dependent upon the exactness of focus of the image at the image plane. When a lens is focused to produce a sharp image of a particular object at the image plane, other objects that are closer or further away do not appear equally sharp. The decline in sharpness is gradual and there is a spacial zone extending in front of and behind the focused subject where the image misfocus is too small to be noticeable and therefore can be accepted as sharp. This zone is commonly referred to as the depth of field of the lens.

In the beginning, photographic cameras only employed lenses of the fixed focus type. In order to form photographic images of acceptable sharpness with such lenses over the greatest possible range of subject distances, their optical characteristics had to be chosen such that the near distance of their depth of field could only extend to within approximately 4 to 5 feet of the camera for an f/14 lens, if images of distant objects (objects at infinity) were to have an acceptably sharp focus at the camera's film plane. An image of an object produced by this type of lens that is located closer to the camera than this near distance would appear blurred or noticeably out of focus.

The production of sharp images of distant as well as relatively close objects is not a problem with an adjustable focus lens. With such a lens, the focus distance and its associated depth of field can be adjusted to produce acceptably sharp images of objects located at virtually any object distance. While an adjustable focus lens has many advantages, including the just-mentioned ability to vary its depth of field, such a lens has certain disadvantages. Among the disadvantages are cost and the increased susceptibility to mechanical failure over that of a fixed focus lens.

An electronic flash, fixed focus lens camera that is capable of forming sharp images of objects located closer to the lens than the near distance of its normal depth of field, has been disclosed. In U.S. Pat. No. 4,459,005 to Harvey, for example, exposure control apparatus for an electronic flash, fixed focus lens camera includes means for controlling exposure with either of two predetermined apertures. The apparatus includes proximity sensing means for detecting when a subject to be photographed is within a given distance of the camera and a mechanism for restricting the exposure aperture to a size that is less than the aperture size the exposure control mechanism would normally employ when the subject is within the aforementioned given distance. The proximity sensing means includes a light emitting diode for illuminating a subject to be photographed with infrared (IR) light and a sensor for measuring subject IR reflectivity. A major disadvantage inherent in this type of electronic flash exposure control apparatus is that for some subject distances, subject reflectivities, and ambient scene lighting conditions, the selected aperture size may be small enough to produce a photograph with a sharp subject image but may be too small to produce an adequately exposed subject background. For other such conditions, the selected aperture size may be large enough to produce a photograph with an adequately exposed subject background but too large to produce a subject image of acceptable sharpness.

SUMMARY OF THE INVENTION

It is a primary object of the present invention, therefore, to provide a low cost, fixed focus lens, electronic flash camera that is capable of forming photographic images having improved sharpness and exposure, of scenes that include subjects located over a wider range of distances than was heretofore possible.

It is another object of the present invention to provide an electronic flash camera with a fixed focus lens whose depth of field can be continuously varied over a wide range of subject distances.

It is a further object of the present invention to provide a fixed focus lens and an exposure control system for a camera that is capable of forming photographic images of improved sharpness and exposure in response to subject IR reflectivity and ambient scene light levels.

In accordance with a preferred embodiment of the present invention, an electronic flash, fixed focus lens, scanning aperture camera is provided that is capable of automatically forming images having improved sharpness and exposure, of scenes that include subjects located over a wider range of distances than was heretofore possible. Such images are formed by firing the electronic flash at the smallest possible aperture for optimum image sharpness and overall scene exposure. The appropriate aperture for firing the electronic flash is established as a function of scene brightness and of subject IR reflectivity levels. Means are provided for determining these levels prior to and/or at the early stages of an exposure interval.

DETAILED DESCRIPTION OF THE PREFERRED EMBODIMENT

Figure 1:
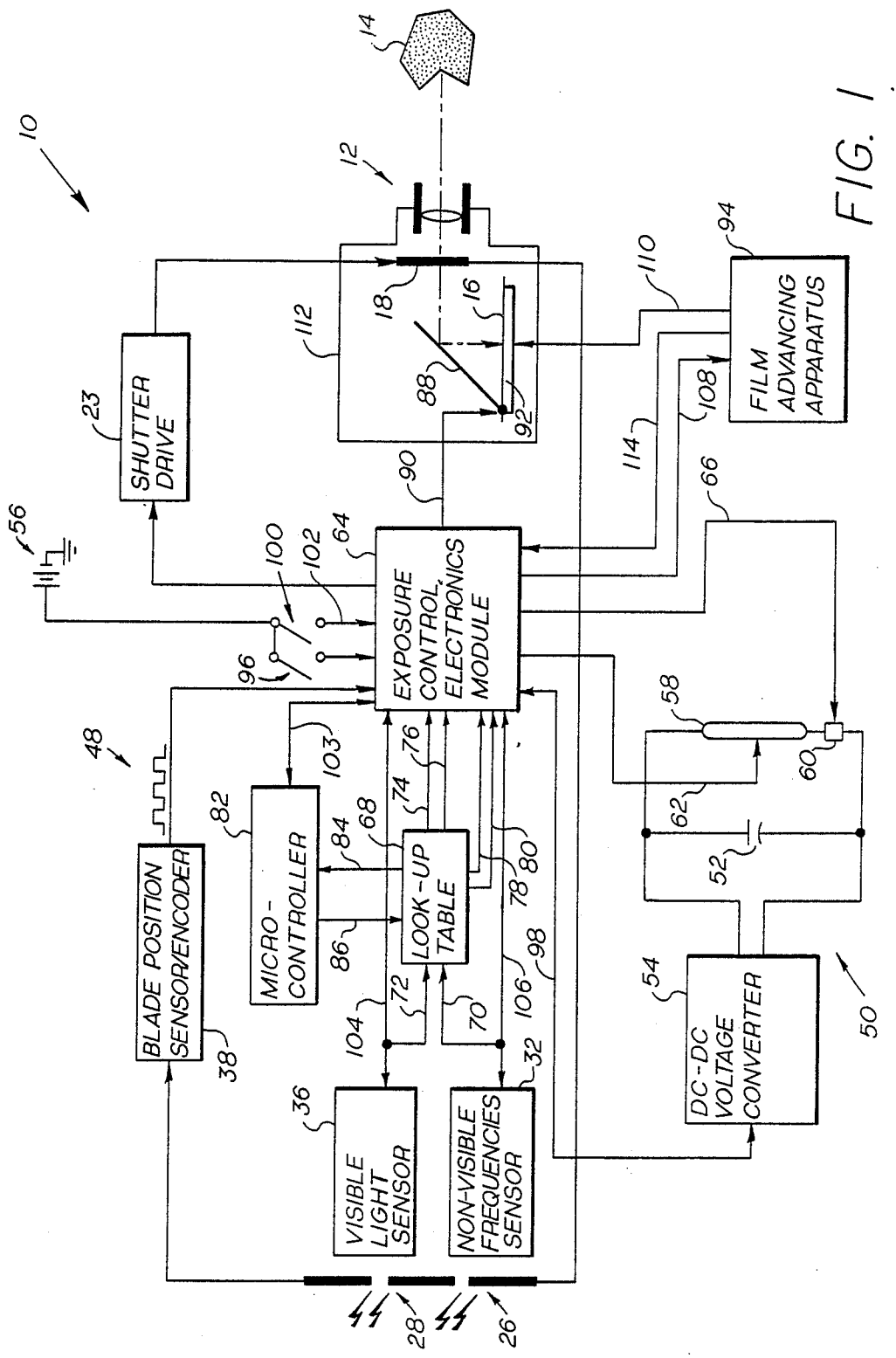
FIG. 1 is a schematic diagram of a photographic camera which incorporates a preferred embodiment of the preflash pseudofocus/exposure control system of the present invention.

Referring now to the drawings, and specifically to FIG. 1, there is shown a single lens reflex (SLR) photographic camera 10 of the self-developing type which incorporates a preferred embodiment of a preflash pseudofocus/exposure control system of the present invention. The camera 10 includes an objective or taking lens 12, of the fixed focus type, that may include one or more elements (only one shown) for focusing image-carrying light rays of, for example, an object 14 on a film plane 16 through an aperture formed in a shutter blade mechanism or assembly 18.

Figure 2A:
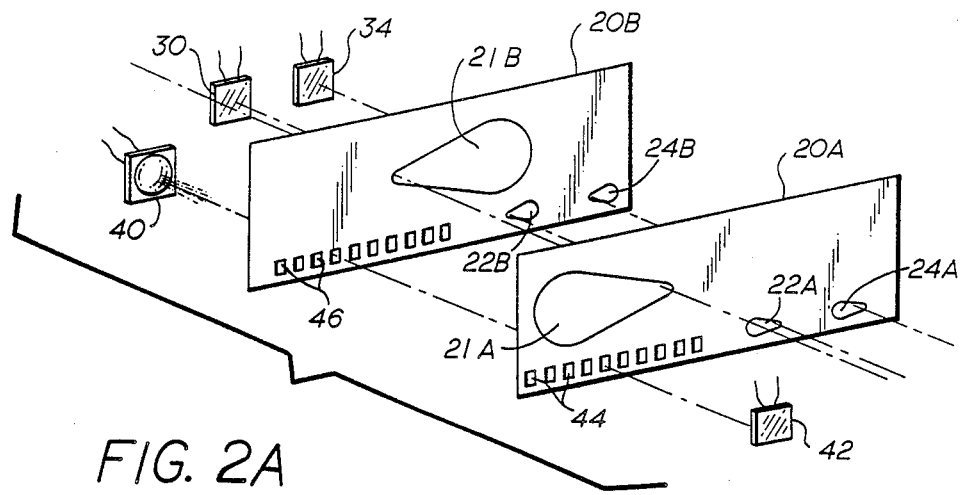
FIG. 2A is an exploded perspective view of a scanning type shutter blade mechanism which is also schematically shown in FIG. 1.
Figure 2B:
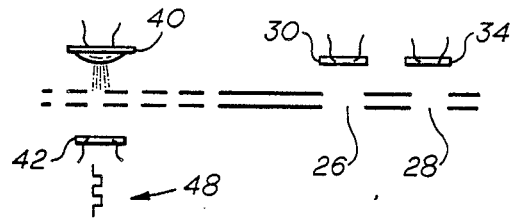
FIG. 2B is an unexploded top view, partly in section, of the shutter blade mechanism of FIG. 2A.
Figure 3:
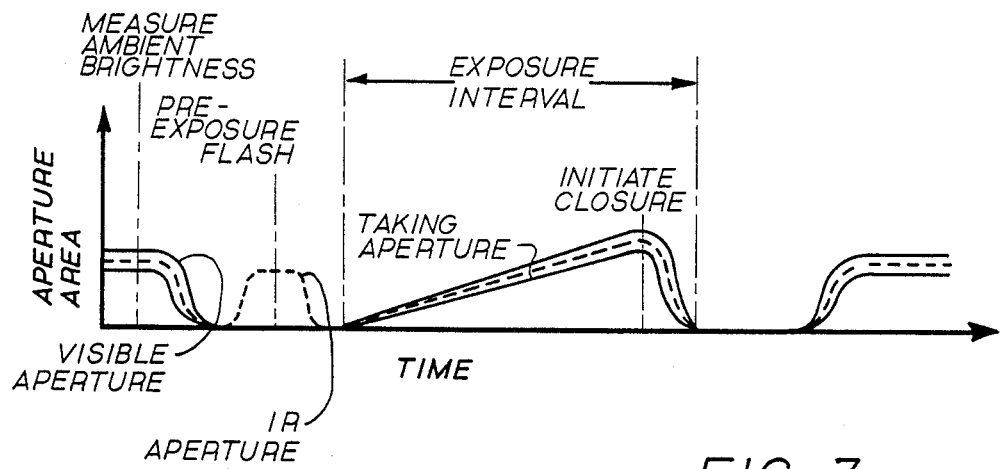
FIG. 3 is a graph showing primary and secondary blade aperture size variations as a function of time, during an exposure interval.

With additional reference to FIGS. 2A and 2B, blade mechanism 18, positioned intermediate of the lens 12 and the film plane 16, includes a pair of overlapping shutter blade elements 20A and 20B of the "scanning" type. Scene light admitting primary apertures, 21A and 21B, are respectively provided in the blade elements 20A and 20B to cooperatively define a progressive and predictable variation of effective aperture openings in accordance with simultaneous longitudinal and lateral displacement of one blade element with respect to the other blade element in a manner more fully described in commonly assigned U.S. Pat. No. 3,942,183 to Whiteside, now specifically incorporated herein by reference. The blade element apertures are selectively shaped so as to overlap the central optical axis of the lens 12 thereby defining a gradually varying effective aperture size as a function of the position of the blade elements 20A and 20B of the blade mechanism 18. A shutter drive 23 is provided for displacing the blade elements 20A and 20B of the blade mechanism 18. The shutter drive 23 includes a tractive electromagnetic device in the form of a solenoid (not shown) employed to displace the shutter blade elements with respect to one another in a manner more fully described in the above-cited Whiteside patent.

Each of the blade elements 20A and 20B of the blade mechanism includes two secondary apertures 22A, 24A and 22B, 24B, respectively. The aperture 22A in blade 20A cooperates with the aperture 22B in blade 20B to form an opening 26 and the aperture 24A in blade 20A cooperates with aperture 24B in blade 20B to form an opening 28 through the shutter assembly 18. These cooperating secondary apertures may be configured to track in a predetermined corresponding relationship with respect to the scene light admitting primary apertures 21A and 21B. With the primary and secondary apertures being formed in the same blade element and therefore being mechanically coupled to one another, it is readily apparent that the secondary apertures can move in the same manner as the primary apertures when the blade elements 20A and 20B are displaced, in the above-described manner, with respect to one another. The amount of artificial light admitted to the film plane 16 through the primary apertures 21A and 21B is controlled by a signal generated by a combination infrared photosensitive element 30 and integrator (not shown) within the non-visible frequencies sensor 32 that senses and integrates a corresponding amount of infrared scene energy through the opening 26. The amount of visible light admitted to the film plate 16 through these primary apertures is controlled by a signal generated by a combination visible light photosensor 34 and integrator (not shown) within a visible light sensor 36 that senses and integrates a corresponding amount of ambient light, through the opening 28. An example of scanning blade elements having primary and secondary apertures that cooperate to control the amount of scene light admitted to a film plane is shown in U.S. Pat. No. 3,942,182, supra.

The camera 10 is provided with a blade position sensor/encoder 38. The sensor/encoder 38 senses the position of the blade elements 20A and 20B with respect to one another and generates a signal representative of the relative blade element position. The sensor/encoder 38 comprises a light emitting diode 40, a photosensor 42 spaced therefrom, and a plurality of slots or openings 44 and 46 formed in the blade elements 20A and 20B, respectively. The slots 44, 46 are rectangular in shape, are of uniform size and are equally spaced in a linear direction in their respective blade elements 20A and 20B. The slots 44, 46 are interposed between the light emitting diode 40 and the photosensor 42 such that they alternately block and unblock the transmission of light between these two components to thereby cause the photosensor 42 to generate one or more pulses 48 representative of the relative position of the blade elements 20A and 20B. The position of the blade element 20A with respect to the blade element 20B defines the size of the effective or taking aperture formed by the primary apertures 21A and 21B in the blade mechanism 18. Therefore, the relative position of the blade elements 20A and 20B represented by the pulse or pulses 48 is also a measure of the size of the effective or taking aperture formed by the primary apertures 21A and 21B. The size of the slots 44, 46 in respective blade members 20A and 20B is kept to a minimum, in the direction of blade member movement, in order to minimize any blade position errors between the actual size of an effective aperture formed by the primary apertures 21A and 21B and the relative blade position pulse signals 48 representative of this particular aperture.

The camera 10 is also provided with an electronic flash apparatus 50 together with apparatus for controlling its energization in order to determine subject reflectivity and to provide a portion of the exposure value required to illuminate a scene to be photographed. The electronic flash apparatus 50 comprises a main storage capacitor 52 which may be charged up to an opening voltage by any conventional voltage converter circuit (not shown) which would be included within a DC-DC voltage converter 54. The DC-DC voltage converter 54 operates in a conventional manner to convert a DC voltage as may be derived from a battery 56 of the camera 10, which can be in the order of 6 volts, to a suitable operating voltage such as 280 volts. A flash tube 58 and a series connected thyristor 60 which are collectively connected in a parallel relation with respect to the main storage capacitor 52. The flash tube 58 may be energized by a suitable trigger signal on a path 62 from a conventional trigger circuit (not shown) within an exposure control electronics module 64, and the thyristor 60 may be ignited by a suitable trigger signal on a path 66 from another conventional trigger circuit (not shown) that is also included within the exposure control electronics module 64. When energized, the flash tube 58 illuminates the scene and subjects included therein with both visible and non-visible frequencies.

The camera 10 additionally includes an empirically derived look-up table 68. The primary purpose of the look-up table 68 is to control the amount of image-carrying scene light rays focused on the film plane 16 by the lens 12 through the effective or taking aperture in the blade mechanism 18 formed by the primary apertures 21A and 21B, as a function of ambient scene light and of subject reflectivity.

As previously explained, the amount of artificial and ambient scene light transmitted to the film plane 16 is indirectly measured by sensing a portion of the artificial and ambient scene light through the openings 26 and 28 in the blade mechanism 18 with photosensors 30 and 34 and their associated integrators located within the non-visible frequencies sensor 32 and the ambient light sensor 36, respectively. A signal generated by the non-visible frequencies sensor 32 and its associated integrator representative of reflected infrared scene light is routed to the look-up table 68 through a path 70 and a signal generated by the visible light sensor 36 and its associated integrator representative of ambient scene light is routed to the look-up table 68 through a path 72. The look-up table 68 generates a plurality of different signals in response to these two signals for controlling the amount of image-carrying light rays transmitted to the film plane 16 through the primary apertures in the blade mechanism 18. These plurality of different signals are derived for each exposure cycle, prior to an exposure interval. As an alternative, these signals may also be derived in the early stages of an exposure interval.

The signals derived by the look-up table 68 are (1) an aperture size signal that controls the size of the taking aperture formed by the primary apertures 21A and 21B at which the flash tube 58 is fired, on an output path 74; (2) a percentage of artificial light signal that controls the amount of artificial light to be added to the scene to be photographed by the flash tube 58, on an output path 76; (3) a percentage of ambient light signal that controls the amount of image-carrying light to be admitted to the film plane 16 through the primary apertures 21A and 21B in the blade mechanism 16, on an output path 78; and (4) a signal to terminate the exposure interval at a time dependent upon the magnitude of the artificial and ambient light signals appearing on the input paths 70 and 72, respectively, to the look-up table 68, if the exposure interval is not sooner terminated, on an output path 80.

Prior to the generation of the above-noted look-up table output signals on the paths 74, 76, 78 and 80, the ambient light signal generated by the visible light sensor 36 and applied to the look-up table 68 through the path 72 is routed to a microcontroller 82 through a path 84, for temporary storage. Subsequent to the storage of the ambient light signal in the microcontroller 82 and prior to the start of an exposure interval, the artificial light or non-visible frequencies sensed by the non-visible frequencies sensor 32 reflected from a scene subject previously illuminated by a wink or short duration flash of light from the flash tube 58 containing both visible and non-visible frequencies is routed to the look-up table 68 through the path 70. The ambient light signal stored within the microcontroller 82 is then routed to the look-up table 62 through a path 86. This stored ambient light signal and the non-visible frequencies signal subsequently generated by the sensor 32 are collectively employed within the look-up table 68 to generate the above-noted signals appearing on the output paths 74, 76, 78 and 80 of the look-up table 68.

The signals appearing at the output paths 74, 76 78 and 80 of the look-up table 68 in response to the artificial and ambient scene light signals respectively generated by the sensors 32 and 36 are empirically determined. The look-up table 68 is constructed in accordance with the subjective analysis of a multiplicity of photographic images of subjects at various distances having a range of reflectivities that are formed under a wide range of artificial and ambient scene lighting conditions, in order to produce these signals.

In general, when forming a photographic image at the film plane 16 of the camera 10 the smaller the taking aperture formed by the primary apertures 21A and 21B, the greater will be the depth of field of the lens 12 and the darker will be the ambient scene exposure level because of the reduction in image-carrying scene light caused by the smaller taking aperture. The look-up table 68 is constructed such that it performs a tradeoff between the sharpness of a subject within the scene and the ambient scene exposure. In performing this tradeoff, the look-up table 68 causes the flash tube 58 to fire at the smallest possible taking aperture, and therefore the greatest depth of field, that will provide the optimum sharpness of a subject within a scene and overall scene exposure. The look-up table 68 further improves the overall scene exposure in response to the artificial and ambient scene light level signals generated by the sensors 32 and 36 by controlling the amount of artificial light generated by the scene-illuminating flash tube 58 and by controlling the maximum size of the taking aperture formed by the primary apertures 21A and 21B.

As noted above, the camera 10 is of the SLR type and therefore includes a conventional reflex mirror that is actuatable by the exposure control electronics module 64 through a path 90. The mirror 88 is actuatable, in a conventional manner, between a viewing position where it blocks the transmission of scene light to the film plane 16 and where a camera operator can view a scene to be photographed through the lens 12, and a taking or unblocking position as shown in FIG. 1, where it facilitates the transmission of scene light to the film plane 16 during an exposure interval.

The camera 10 is preferably designed for use with a self-developing film unit (not shown) similar to those described in U.S. Pat. No. 3,415,644 to Land, in common assignment herewith, and specifically incorporated herein by reference. The self-developing film unit is packaged in a light-tight film cassette 92 shown in the condition assumed just after the cassette 92 has been fully inserted into the camera 10. The cassette 92 may enclose the 6 VDC battery 56.

Mounted within the camera 10 is a film advancing apparatus 94 similar to that described in U.S. Pat. No. 3,753,392 to Land that includes a motor for operating a gear train (neither shown) which is coupled with the film advancing apparatus 94 to provide for the continuous movement of an exposed film unit from an exposure position within the camera 10 toward the exterior thereof. The film advancing apparatus 94 additionally includes a film-engaging arm member (not shown) driven by the above-mentioned motor and gear train. The arm member is adapted to extend into a slot in the cassette 92, as shown in the above-noted Land '392 patent, and engage the uppermost film unit located therein at or near its trailing edge prior to moving it out of the cassette 92 and into the bite of a pair of conventional processing rollers (not shown) mounted adjacent the leading edge of the above-mentioned uppermost film unit. The processing rollers, which are rotated by the motor and gear train mentioned above, continue the uninterrupted movement of the exposed film unit toward the exterior of the camera 10 while simultaneously rupturing a container of processing liquid at the leading end of the exposed film unit. The processing rollers spread the liquid contents of the ruptured container between elements of the film unit to initiate formation of a visible image within the film unit in a manner that is well-known in the art.

OPERATION

A typical exposure cycle will now be described in detail. For the purpose of this description it is assumed that the taking aperture of the blade mechanism 18 is in its full open position, that the openings 26 and 28 formed by the secondary apertures in the blade mechanism 18 are also fully opened, that the mirror 88 is in its viewing or light blocking position, that the flash apparatus 50 has been energized by the prior closure of a switch 96 that coupled the battery 56 to the DC-DC voltage converter 54 through the exposure control electronics module 64 and a path 98 and that the main storage capacitor 52 is fully charged and is ready for the initiation of an exposure cycle. With reference to FIGS. 1, 2A, 2B and 3 of the drawings, a switch 100 is actuated to its closed position by a camera operator to initiate the exposure cycle. The closure of the switch 100 couples the battery 56 to the exposure control electronics module 64 through a path 102. With the blade mechanism opening 28 formed by the secondary apertures 24A and 24B adjacent the ambient light sensor 36 in its full open position, the exposure control electronics module 64 and the microcontroller 82 coupled thereto through a path 103, in turn, enable the visible light sensor 36 through a path 103 to integrate ambient scene light for a fixed period of time and then send the integrated value to the look-up table 68 through the path 72 and then to the microcontroller 82 through the path 84 for temporary storage.

The exposure control electronics module 64 then energizes the shutter drive 23 to actuate the blade mechanism 18 and therefore the taking aperture together with the opening 26 formed by the secondary apertures 22A and 22B and the opening 28 formed by the secondary apertures 22A and 24B to their fully closed positions. Subsequent to closing the opening 26 and prior to the initiation of an exposure interval, the shutter drive 23 causes the opening 26 to increase in size toward its fully opened position. While the opening 26 is being moved toward its fully opened position, the exposure control electronics module 64 actuates means (not shown) for moving the mirror 88 from its viewing or light blocking position, where it precludes the transmission of image-carrying light rays to the film plane 16, to its light unblocking position (as shown in FIG. 1), where it facilitates the transmission of image-carrying light rays to the film plane 16 during an exposure interval. When the opening 26 adjacent the non-visible frequencies sensor 32 in its fully opened position the exposure control electronics module 64 triggers the flash tube 58 through the path 62 and thereby illuminates the scene to be photographed with light containing both visible and non-visible frequencies prior to the initiation of an exposure interval. The exposure control electronics module 64 then triggers the thyristor 60 through the path 66 thirty-five microseconds after triggering the flash tube 58 to thereby extinguish the light output of the flash tube 58. This thirty-five microsecond illumination of the scene constitutes a first pulse of light directed toward the scene to be photographed.

In addition to causing the illumination of the scene for thirty-five microseconds prior to or shortly after the initiations of an exposure interval, the exposure control electronics module 64 enables the integrator within the non-visible frequencies sensor 32 through a path 106 during this same period of time and then causes the integrated value, which constitutes a measure of subject reflectivity, to be sent to the look-up table 68 through the path 70. Upon receipt of this subject reflectivity signal, the look-up table 68 combines it with the ambient light or scene brightness signal previously stored in the microcontroller 82. These combined signals are then employed to generate the aperture size flash fire signal, the percentage of artificial light signal, the percentage of ambient light signal and the end of exposure signal subsequently appearing on the look-up table output paths 74, 76, 78 and 80, respectively, that are, in turn, applied to the exposure control electronic module 64. Upon receipt of these look-up table generated signals, the exposure control electronics module 64 actuates the shutter drive 24 and the blade mechanism 18 coupled thereto such that the opening 26 formed by the secondary apertures 22A and 22B is placed in its fully closed position and actuates the shutter drive 23 and the blade mechanism 18 to initiate an exposure interval. The exposure control electronics module 64 includes four conventional comparators (not shown) to determine when the four conditions represented by the look-up table output signals on the paths 74, 76, 78 and 80 and employed in the generation of an exposure interval have been achieved. An exposure interval is defined herein as the period of time that the shutter mechanism 18 allows image-carrying light rays collected by the lens 12 to reach the film plane 16.

The first of the above-mentioned comparators compares the reference or desired aperture size flash fire signal on look-up table output path 74 with the actual blade position signal and therefore the taking aperture size as represented by the pulses 48 from the blade position sensor/encoder 38. When this first comparator determines that these two signals are equal, the exposure control electronics module 64 once again triggers the flash tube 58 through the path 62 and thereby illuminates the scene being photographed with light containing both visible and non-visible frequencies during the exposure interval.

The second of the above-mentioned comparators compares the reference or desired percentage of artificial light signal on look-up table output path 76 with the actual level of artificial light illuminating the scene as sensed by the non-visible frequencies sensor 32 during the exposure interval and routed to the exposure control electronics module 64 through the path 106. When this second comparator determines that these two signals are equal, the exposure control electronics module 64 triggers the thyristor 60 through the path 66 to thereby extinguish the artificial light being generated by the flash tube 58. This illumination of the scene with artificial light constitutes a second pulse of light that is directed toward the scene to be photographed.

The third of the above-mentioned comparators compares the reference or desired percentage of visible signal on look-up table output path 76 with the actual level of visible light illuminating the scene as sensed by the visible light sensor 36 and routed to the exposure control electronics module 64 through the path 104. When the third comparator determines that these two signals are equal, the exposure control electronics module 64 actuates the shutter drive 23 to close the taking aperture in the blade mechanism 18 and thereby terminate the exposure interval.

Under certain scene lighting and subject reflectivity conditions there may be insufficient ambient and/or artificial scene light reflected from the scene for non-visible frequencies sensor 32 and/or the visible light-tight sensor 36 to generate a signal that is capable of causing the exposure control electronics module 64 to terminate an exposure interval in a reasonable amount of time. A fourth comparator arrangement is provided to overcome this problem. This fourth comparator compares a signal on the look-up table output path 80 representative of the level of ambient and/or scene light reflected from the scene with a predetermined reference signal stored within the exposure control electronics module 64. If the signal on path 80 is greater than the reference signal, the exposure interval will be limited to a relatively short period of time such as 40 milliseconds and if it is less than the reference signal, the exposure interval will be limited to a relatively long period of time such as 400 milliseconds unless terminated sooner by the presence of greater levels of ambient and/or artificial scene light.

At the completion of the exposure interval, the exposure control electronics module 64 actuates the mirror 88 towards its light-blocking position, and actuates the film advancing apparatus 94 and the drive motor (not shown) included therein, through a path 108, to initiate the transport and processing of an exposed, self-developing film unit. The film advancing apparatus 94, in turn, moves the exposed film unit located in the cassette 92, through a path 110, into the bite of the pair of adjacent processing rollers (not shown), in the manner described above, to spread processing liquid between certain film layers and to move the exposed film unit into an exit slot (not shown) in a housing 112 of the self-developing camera 10. After the mirror 88 has been actuated to its light blocking position where it precludes the passage of light to the film plane, the exposure control electronics module 64 actuates the shutter drive 23 and the shutter mechanism 18 coupled thereto such that the primary or taking aperture thereof is placed in its fully opened position. After the film advancing apparatus 94 has moved the exposed film unit through the above-mentioned pair of rollers, a film movement completion signal is routed to exposure control electronics module 64 and the microcontroller 82 coupled thereto through a path 114. Upon receipt of this film movement completion signal, the exposure control electronics module 64 initiates the charging of the electronic flash apparatus 50 through the path 98. When the main storage capacitor 52 of the electronic flash apparatus 50 is fully charged, as sensed through the path 98, the exposure control electronic module 64 places the exposure control system of the camera 10 in condition for the initiation of the next exposure cycle.

In the exposure control system described above, a source of artificial light generated by the flash tube 58 was employed to illuminate the scene with both visible and non-visible electromagnetic frequencies. The flash tube 58 illuminates the scene twice during an exposure cycle, once before and once during an exposure interval. Both the visible and non-visible frequencies were employed for exposure control during an exposure interval. However, only the non-visible frequencies from the flash tube 58 were employed for exposure control immediately prior to or at the early stages of the exposure interval. By firing the flash tube 58 twice and utilizing the non-visible frequencies portion of the illumination generated thereby in the determination of subject reflectivity before an exposure interval, only a single source of illumination is required. It should be noted, however, that exposure interval and pre-exposure interval illumination could be provided with two separate light sources. One source would be that provided by the flash tube 58 to generate both visible and non-visible frequencies and would be employed during the exposure interval. The other source would only have to emit non-visible electromagnetic frequencies prior to an exposure interval and therefore an infrared light emitting diode, for example, could be employed for such purposes.

From the foregoing description of the invention it will be apparent to those skilled in the art that various improvements and modifications can be made in it without departing from its true scope. The embodiments described herein are merely illustrative and should not be viewed as the only embodiments that might encompass the invention.

What is claimed:

1. A camera for forming a photographic image of optimum sharpness and overall scene exposure having means for defining a film plane comprising:
    a fixed focus lens for directing image-carrying light rays along an optical path from a scene onto photosensitive material located in the film plane;
    a blade mechanism mounted for movement between a blocking arrangement in which said blade mechanism is in light blocking relation with respect to the optical path so as to preclude scene light from being transmitted along the optical path to the film plane and an unblocking arrangement in which said blade mechanism is in light unblocking relation with respect to the optical path so as to allow the passage of scene light to the film plane through an exposure aperture, said blade mechanism serving to provide an exposure aperture whose size varies in a predetermined manner when said blade mechanism is actuated between its said light blocking and unblocking arrangements to produce an exposure interval;
    a source of artificial light for directing visible and non-visible electromagnetic frequencies toward the scene;
    means for sensing ambient scene light before or at the early stages of and during an exposure interval and for generating signals representative thereof;
    means for sensing non-visible electromagnetic frequencies reflected from a scene subject before or at the early stages of and during an exposure interval and for generating signal representative thereof;
    means responsive to the said ambient scene light signal and the said non-visible electromagnetic frequencies signal generated prior to or at the early stages of an exposure interval for generating a signal representative of a minimum blade mechanism exposure aperture size at which said source of artificial light is to be actuated to illuminate the scene during an exposure interval; and
    control means for (1) actuating said light source to direct a first pulse of light containing at least said non-visible electromagnetic frequencies toward a subject in a scene before or at the early stages of an exposure interval, (2) for actuating said light source to direct a second pulse of light containing both of said visible and non-visible electromagnetic frequencies toward the scene in correspondence with said exposure aperture size signal and the said non-visible electromagnetic frequencies signal generated during the exposure interval, and (3) for actuating said blade mechanism to generate the exposure interval in correspondence with the said ambient scene light signal generated during the exposure interval to thereby form a photographic image of optimum sharpness and overall scene exposure.

2. The camera of claim 1 wherein said source of artificial light is a quench strobe and said control means further includes a manually actuatable switch the actuation of which generates a sequence initiation signal, and said non-visible frequencies sensing and signal generating means includes means for integrating the sensed non-visible frequencies reflected from a scene subject for a fixed period of time, prior to or at the early stages of an exposure interval and for generating a signal representation thereof, and the initiation and termination of the transmission of said first pulse of light toward the scene subject by said quench strobe is responsive to said sequence initiation and integrated non-visible electromagnetic frequencies signals, respectively.

3. The camera of claim 2 wherein said fixed period of time is approximately 35 microseconds.

4. The camera of claim 1 wherein said source of artificial light is a quench strobe and said control means for actuating said quench strobe to direct said second pulse of light toward the scene includes means responsible to the said minimum aperture size signal and the said non-visible electromagnetic frequencies signal generated during an exposure interval for initiating and terminating the transmission of said second pulse of light, respectively.

5. The camera of claim 1 wherein said means for generating a signal representative of said minimum exposure aperture size additionally includes means responsive to said ambient scene light signal and said non-visible electromagnetic frequencies signal generated prior to or at the early stages of an exposure interval for generating signals representative of the percentage of artificial and ambient light to be employed in forming said optimum photographic image, and said artificial light source and said blade mechanism actuating control means are respectively responsive to said percentage of artificial light signal and said percentage of ambient light signal for respectively controlling the duration of said second pulse of light and the size of said blade mechanism exposure aperture.

6. The camera of claim 1 wherein said control means includes a manually actuatable switch the actuation of which generates a sequence initiation signal and additionally includes means responsive to said sequence initiation signal, and said ambient scene light and said non-visible electromagnetic frequencies signals generated prior to or at the early stages of an exposure interval for terminating said exposure at a selected time subsequent to the generation of said sequence initiation signal.

7. The camera of claim 1 wherein said control means includes means for generating a signal representative of the actual size of said blade mechanism aperture and said means for actuating said light source to direct a second pulse of light toward the scene is responsive to a particular value of said actual exposure aperture size signal.

8. The camera of claim 7 wherein said blade mechanism includes a pair of thin, elongated blade members mounted in superposed relation for simultaneous displacement in opposite directions in response to said blade mechanism actuating control means with each blade member incorporating an array of blade position apertures arranged in an opposed relation and interposed between a light emitting and a light sensitive device such that relative movement of said blade members alternately blocks and unblocks the transmission of light between said light emitting and light sensitive devices to thereby cause said light sensitive device to generate one or more pulses representative of relative blade number positions and therefore said signal representative of the actual exposure aperture size.

9. A method of forming a photographic image of optimum sharpness and overall scene exposure at a film plane of a camera with a fixed focus lens comprising the steps of:

positioning the fixed focus lens so as to direct image-carrying light rays along an optical path from a scene onto photosensitive material located in the film plane;

mounting a blade mechanism for movement between a blocking arrangement in which said blade mechanism is in light blocking relation with respect to the optical path so as to preclude scene light from being transmitted along the optical path to the film plane and an unblocking arrangement in which said blade mechanism is in light unblocking relation with respect to said optical path so as to allow the passage of scene light to the film plane through an exposure aperture defined by the blade mechanism, said blade mechanism serving to provide an exposure aperture whose size varies in a predetermined manner when actuated between its said light blocking and unblocking arrangements to produce an exposure interval;

providing a light source for directing visible and non-visible electromagnetic frequencies toward the scene;

sensing ambient scene light before or at the early stages of and during an exposure interval and generating signals representative thereof;

sensing non-visible electromagnetic frequencies reflected from a scene subject before or at the early stages of and during an exposure interval and generating signals representative thereof;

generating a signal responsive to the said ambient scene light and non-visible electromagnetic frequencies signals generated prior to or at the early stages of an exposure interval representative of the smallest blade mechanism exposure aperture size at which the scene is to be illuminated with visible and non-visible electromagnetic frequencies during an exposure interval; and actuating said light source to direct a first pulse of at least non-visible electromagnetic frequencies toward the scene before or at the early stages of an exposure interval, actuating said light source to direct a second pulse of light containing said visible and non-visible electromagnetic frequencies toward the scene in correspondence with said exposure aperture size signal and said non-visible electromagnetic frequencies signal sensed during the exposure interval, and actuating said blade mechanism to generate the exposure interval in correspondence with the said ambient scene light signal generated during the exposure interval to thereby form a photographic image of optimum sharpness and overall scene exposure.

10. The method of claim 9 wherein said step of sensing non-visible electromagnetic frequencies reflected from a scene subject before or at the early stages of an exposure interval and generating a signal representative thereof includes the step of integrating said electromagnetic frequencies for a fixed period of time and generating a signal representative of the magnitude thereof at the end of said period of time which constitutes said non-visible electromagnetic frequencies signal.

11. The method of claim 9 wherein said step of generating a signal representative of the smallest blade mechanism exposure aperture size at which the scene is so illuminated during an exposure interval additionally includes the step of generating signals representative of the percentage of artificial and ambient light to be employed in forming said optimum photographic image and said step of actuating said light source to direct said second pulse of light and actuating said blade mechanism to generate said exposure interval includes the additional step of so actuating said light source and said blade mechanism in additional correspondence with said artificial and ambient light percentage signals, respectively, to thereby form said photographic image of optimum sharpness an overall scene exposure.

12. The method of claim 11 wherein said step of actuating said light source and said blade mechanism in correspondence with said artificial and ambient light percentage signals, respectively, includes the steps of employing said artificial light percentage signal to terminate the illumination of the scene during the exposure interval by said light source and employing said ambient light percentage signal to terminate the generations of the exposure interval by said blade mechanism.

* * * * *